US006951350B2

(12) United States Patent
Heidorn et al.

(10) Patent No.: US 6,951,350 B2
(45) Date of Patent: Oct. 4, 2005

(54) SEATBELT AIRBAG

(75) Inventors: Michael E. Heidorn, Carefree, AZ (US); Alex Devonport, Glendale, AZ (US); Wesley Pack, Gilbert, AZ (US); Jesse Lee Davidson, Phoenix, AZ (US); Said S. Nakhla, Clarkston, MI (US)

(73) Assignee: Universal Propulsion Company, Inc., Phoenix, AZ (US)

( * ) Notice: Subject to any disclaimer, the term of this patent is extended or adjusted under 35 U.S.C. 154(b) by 100 days.

(21) Appl. No.: 10/613,440

(22) Filed: Jul. 2, 2003

(65) Prior Publication Data

US 2004/0164532 A1 Aug. 26, 2004

Related U.S. Application Data

(60) Provisional application No. 60/449,660, filed on Feb. 24, 2003.

(51) Int. Cl.[7] ........................ B60R 21/18
(52) U.S. Cl. ........................ 280/733
(58) Field of Search ........................ 280/733, 801.1

(56) References Cited

U.S. PATENT DOCUMENTS

| | | | | | |
|---|---|---|---|---|---|
| 5,303,953 | A | * | 4/1994 | Kamiyama et al. | 280/733 |
| 5,354,096 | A | * | 10/1994 | Tanaka et al. | 280/733 |
| 5,383,713 | A | | 1/1995 | Kamiyama et al. | |
| 5,385,367 | A | * | 1/1995 | Tanaka et al. | 280/733 |
| 5,390,953 | A | * | 2/1995 | Tanaka et al. | 280/733 |
| 5,393,091 | A | * | 2/1995 | Tanaka et al. | 280/733 |
| 5,474,326 | A | * | 12/1995 | Cho | 280/733 |
| 5,765,869 | A | * | 6/1998 | Huber | 280/733 |
| 6,126,194 | A | * | 10/2000 | Yaniv et al. | 280/733 |
| 6,142,511 | A | * | 11/2000 | Lewis | 280/733 |
| 6,217,063 | B1 | * | 4/2001 | Takeuchi | 280/733 |
| RE37,280 | E | * | 7/2001 | Tanaka et al. | 280/733 |
| 6,340,173 | B1 | | 1/2002 | Specht | |
| 6,439,601 | B1 | | 8/2002 | Iseki | |
| 6,648,369 | B2 | * | 11/2003 | Mishima et al. | 280/733 |
| 6,698,790 | B2 | * | 3/2004 | Iseki et al. | 280/733 |
| 2002/0074783 | A1 | | 6/2002 | Iseki et al. | |
| 2002/0195803 | A1 | | 12/2002 | Terbu et al. | |

FOREIGN PATENT DOCUMENTS

| | | |
|---|---|---|
| WO | 99/65733 | 12/1999 |

* cited by examiner

*Primary Examiner*—Paul N. Dickson
*Assistant Examiner*—Joselynn Y. Sliteris
(74) *Attorney, Agent, or Firm*—Jerry Holden; John Titus

(57) ABSTRACT

A seatbelt airbag is formed of a flexible fabric seat belt tube the first end of which is attached to the floor of the vehicle and the second end of which is wound over a conventional seatbelt retractor. In the uninflated condition, the fabric tube forms a flat belt that passes in a conventional manner through a slotted eyelet in a tongue member that is engaged in a conventional floor-mounted seatbelt buckle to form a conventional 3-point restraint having a lap portion and a torso portion. An inflatable airbag member is disposed within the flexible fabric tube extending from the fixed end of the fabric tube to a location past the tongue fitting into the torso portion of the seatbelt. The airbag member is encased for part of its length within a reinforcing sleeve that extends part way into the torso section. In operation, as the airbag is pressurized, in the area surrounded by the reinforcing sleeve, the inflatable airbag member expands only to the size of the reinforcing sleeve to form a gas channel, but does not rupture the reinforcing sleeve or the surrounding seatbelt tube. The portion of the inflatable airbag that extends beyond the open end of the reinforcing tube, however, ruptures the seatbelt tube and expands to its full diameter.

12 Claims, 7 Drawing Sheets

SEATBELT AIRBAG

This application claims the benefit of provisional application No. 60/449,660, filed Feb. 24, 2003.

BACKGROUND OF THE INVENTION

This invention relates generally to automotive safety devices and in particular to seatbelt safety devices for protecting vehicle occupants.

Seatbelt devices used to secure vehicular occupants in their seats typically comprise a single continuous length of webbed belt, one end of which is rigidly attached to the vehicle frame and the other end attached to an automatic retractor also mounted to the vehicle frame. The belt passes through a slot formed in a metal tongue that is plugged into a latch mounted to the floor of the vehicle on the side of the seat opposite the retractor and the rigid mount. The rigid mount, latch and retractor thus form a 3-point restraint.

It is generally preferable to mount the automatic retractor so that the seatbelt webbing is paid out over the shoulder of the occupant so that the occupant is freely able to lean forward and backward without the necessity of paying the seatbelt webbing in and out across the occupant's lap and through the slot in the latch tongue as would be necessary with a floor mounted retractor. Consequently, the most popular front seat passenger restraint systems comprise a rigid mount at the floor and a retractor mounted proximal to the floor in the area of the B-pillar of the vehicle. The retractor pays out and retracts the seatbelt webbing typically through a D-ring attached to the B-pillar above the area of the occupant's shoulder.

Conventional seatbelt webbing measures approximately 2 inches across its width. This two inch dimension is, however, a compromise between comfort and function. It has long been recognized that because of this limited width, the seatbelt webbing places enormous local loads on the passenger when restraining the passenger in a collision. Yet, ordinary webbing cannot be made substantially wider without rendering the seatbelt too cumbersome to use. In efforts to solve this problem, inflatable seatbelt apparatus have been proposed.

U.S. Pat. No. 3,841,654 to Lewis discloses a vehicle safety system in which a seatbelt has an inflatable section that is normally maintained in an uninflated state. The seat belt is positioned about a wearer when the wearer is seated in a seat within the vehicle. Inflating means are provided that are capable of inflating the inflatable section prior to any substantial forward motion of the seatbelt wearer relative to the seatbelt. By providing an inflatable belt, the load of the occupant against the seatbelt is distributed over a much wider area and, therefore, the occupant is much less likely to be injured by the seatbelt.

Because of the industry preference for seatbelt retractors that pay out and retract the seatbelt over the occupant's shoulder, the most practical location to mount the inflator for an inflatable seatbelt is near the fixed end of the belt which is attached directly to the vehicle frame near the floor. This substantially simplifies the design of any electrical interconnections or other connections between the inflator and the vehicle. Unfortunately, mounting of the inflator at the stationary end of the seatbelt webbing dictates that, during a collision, gas from the inflator must pass through the lap portion of the seatbelt and past the bend at the tongue in order to inflate the most critical part of the inflatable seatbelt, namely that portion of the seatbelt across the occupant's torso.

U.S. Pat. No. 5,383,713 to Kamiyama, et al. discloses an inflatable seatbelt apparatus comprising a floor mounted inflator coupled to a seatbelt airbag in which the eyelet in the tongue has a movable flap that opens to permit gas from the inflator to enter the torso portion of the seatbelt airbag. U.S. Pat. No. 5,474,326 to Cho, discloses a seatbelt airbag having a tongue eyelet equipped with a breakaway flap that opens during inflation to allow gas to pass from the lap portion of the belt into the torso portion of the belt. Although Kamiyama and Cho provide for a larger aperture through the eyelet in the seatbelt tongue, neither provide a substantial solution to the problem of the fabric pinching around the tongue, which will inherently impede gas flow. U.S. Pat. No. 6,340,173 to Specht, discloses a seatbelt airbag in which the lap portion of the belt includes a non-collapsing internal tube in the lap portion of the belt. The tube directs the output from the inflator into the torso portion of the belt. The rigid internal tube, however, renders the lap portion of the seatbelt bulky and awkward to wear.

Accordingly, what is needed is an inflatable seatbelt apparatus that reliably inflates the torso portion of the inflatable seatbelt, yet remains flat and comfortable to wear when uninflated.

SUMMARY OF THE INVENTION

The present invention comprises a seatbelt airbag in which a portion of the airbag is encased in a sleeve that prevents the airbag from fully inflating in the area surrounded by the sleeve.

According to an illustrative embodiment, the seatbelt airbag comprises a flexible fabric tube, the first end of which is attached to the floor of the vehicle and the second end of which is wound over a conventional seatbelt retractor. In the uninflated condition, the fabric tube forms a flat belt that passes in a conventional manner through a slotted eyelet in a tongue member that is plugged into a conventional floor-mounted seatbelt buckle. The flexible fabric tube thus forms a conventional 3-point restraint having a lap portion and a torso portion. An inflatable airbag member is disposed within the flexible fabric tube extending from a position proximal the fixed end of the fabric tube and extending past the tongue fitting into the torso portion of the seatbelt. A seatbelt airbag inflator is in fluid communication with the inflatable airbag member near the fixed end of the seatbelt. The infaltor can either be floor mounted with a tube leading into the airbag member or may be mounted within the seatbelt itself. The airbag member is encased for part of its length within a reinforcing sleeve. One end of the reinforcing sleeve is closed and is essentially coincident with the closed end of the inflatable airbag member at the inflator end. The length of the reinforcing sleeve is selected such that the open end of the reinforcing sleeve is just beyond the tongue fitting when the seatbelt is being used by a $95^{th}$ percentile man.

The flexible fabric tube comprising the seatbelt has a longitudinal seam, stress concentration or other weakness that is designed to fail to allow the tube to rupture under the inflation pressure of the inflatable airbag member. The reinforcing sleeve, however, is of sufficient strength to resist rupturing under the inflation pressure of the inflatable airbag member. Accordingly, in operation, when a vehicle equipped with an illustrative seatbelt airbag collides with an obstacle or other obstacles at higher intensity than a predetermined value, the inflatable air member is pressurized. In the area surrounded by the reinforcing sleeve, the inflatable airbag member expands to the size of the reinforcing sleeve to form a gas channel, but does not rupture the reinforcing sleeve or the surrounding seatbelt tube. The portion of the inflatable airbag that extends beyond the open end of the reinforcing tube, however, ruptures the seatbelt tube and expands to its full diameter. As the airbag expands, the enlarged area of the airbag presses against the open end of the reinforcing sleeve. This causes the reinforcing sleeve to buckle and collapse backward toward the tongue fitting in an accordion-like fold. Thus, the sleeve retracts toward the tongue fitting to permit the airbag to fully inflate across the torso of the occupant. Alternatively, the reinforcing sleeve is provided with a stress concentration at the open end. When the airbag inflates, a tear propagates from the stress concentration at the open end to the tongue fitting, thereby allowing the airbag to fully inflate across the torso of the occupant.

BRIEF DESCRIPTION OF THE DRAWING

The present invention will be better understood from a reading of the following detailed description, taken in conjunction with the accompanying drawing figures in which like references designate like elements and, in which.

DETAILED DESCRIPTION

Figure 1:
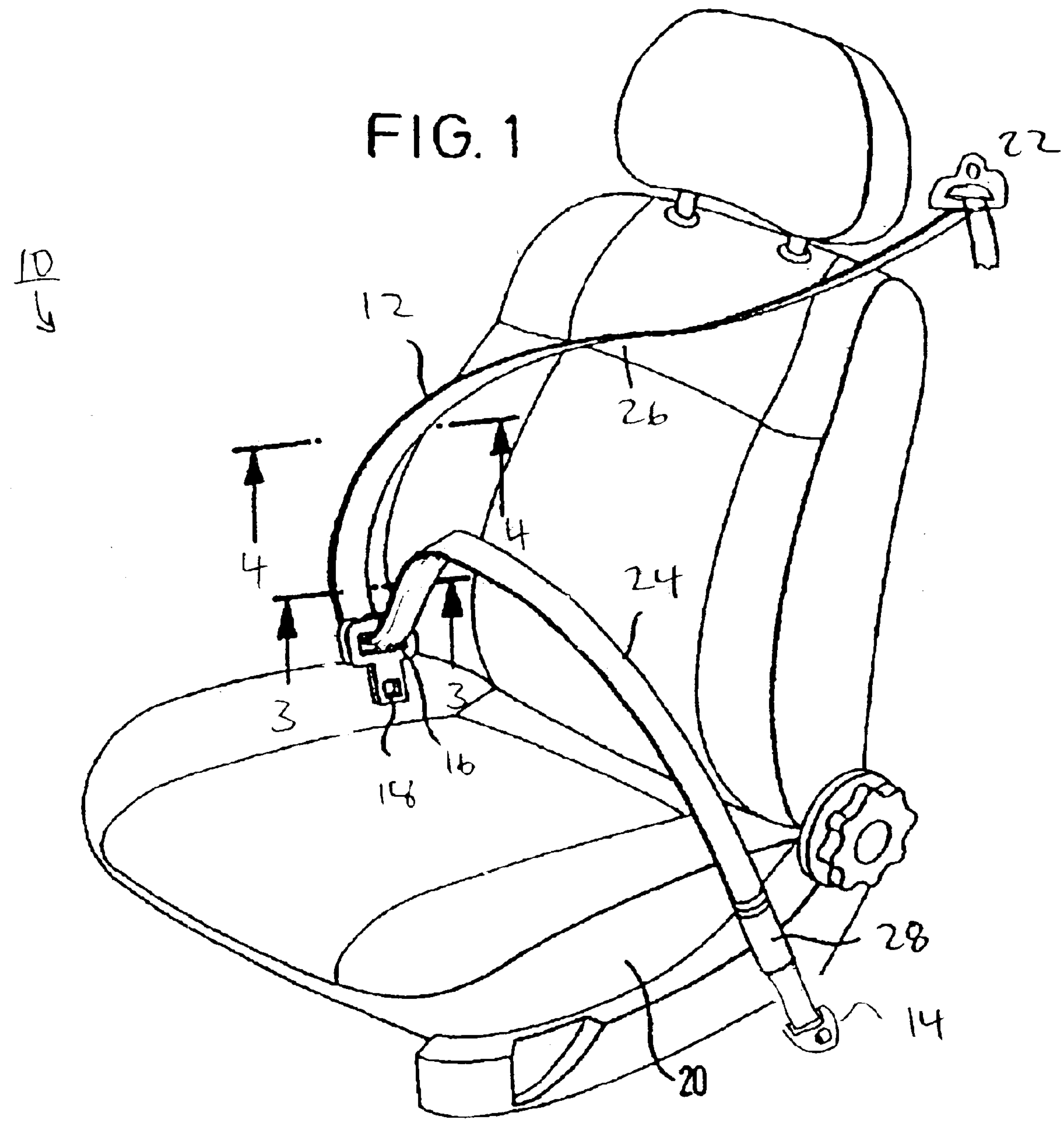
FIG. 1 is a perspective view of a seatbelt incorporating features of the present invention.

The drawing figures are intended to illustrate the general manner of construction and are not necessarily to scale. In the detailed description and in the drawing figures, specific illustrative examples are shown and herein described in detail. It should be understood, however, that the drawing the figures and detailed description are not intended to limit the invention to the particular form disclosed, but are merely illustrative and intended to teach one of ordinary skill how to make and/or use the invention claimed herein and for setting forth the best mode for carrying out the invention.

With reference to FIG. 1, inflatable seatbelt apparatus 10 comprises a seatbelt 12 formed of a continuous piece of tubular webbing that is flattened to form the belt. Seatbelt 12 is attached at one end to the vehicle frame, typically near the floor, by an end fitting 14. The opposite end of seatbelt 12 is guided through an eyelet 16 in a tongue fitting 18, which forms the male portion of a conventional seatbelt buckle. From there, seatbelt 12 is routed to a belt retractor 30 (not shown in FIG. 1) in a manner well known in the art, for example through a D-ring 22, preferably a roller D-Ring, mounted to the B-pillar of the vehicle. Thus mounted, seatbelt 12 forms a conventional 3 point restraint for an occupant of seat 20 comprising a lap portion 24 and a torso portion 26. An inflator 28 is mounted within seatbelt 12 to provide a source of inflation gas for inflating the inflatable portion of seatbelt apparatus 10 in a manner described more fully hereinafter. Inflator 28 may be any conventional source of inflation gas, whether floor mounted with a tubular connection to the inflatable portion or mounted within the inflatable portion. In the illustrative embodiment inflator 28 comprises the high efficiency inflator disclosed in U.S. Pat. No. 6,142,511 to Lewis, the contents of which are incorporated herein by reference.

Figure 2:
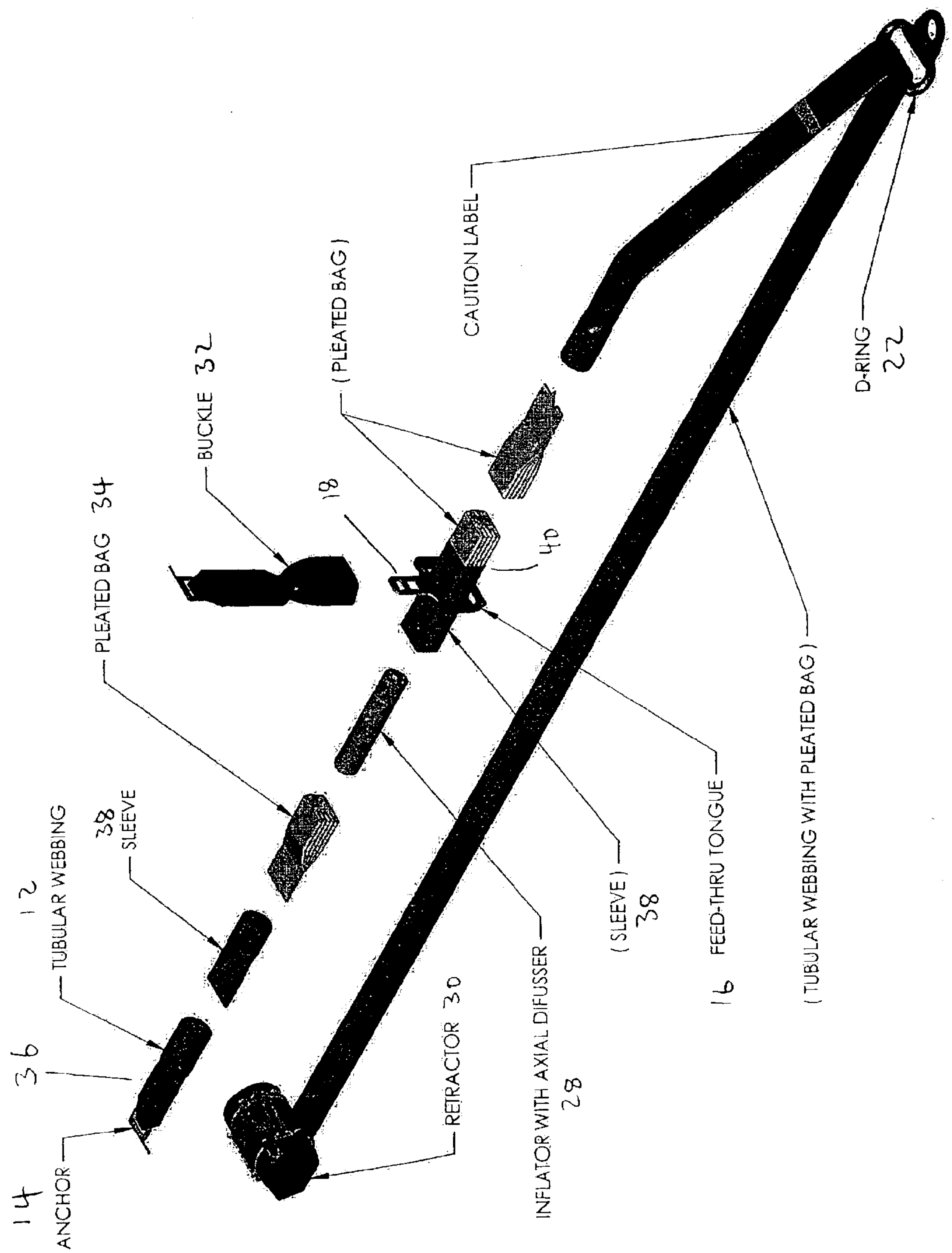
FIG. 2 is an exploded perspective view of a seatbelt incorporating features of the present invention.

With reference to FIG. 2, the principal components of the seatbelt of FIG. 1 comprise the end fitting 14 to which seatbelt 12 is attached proximal to the floor of the vehicle. Seatbelt 12 passes through eyelet 16 of tongue fitting 18 through D-ring 22 to a conventional refractor 30. Tongue fitting 18 is adapted to be received in a buckle 32 in a conventional manner. Disposed within seatbelt 12 is airbag 34 which, in the illustrative embodiment comprises an elongate tubular bag composed of 210×210 denier silicone coated nylon fabric that is folded into five pleats along one edge in a so-called "rooster tail" fold pattern to form a relatively flat ribbon of material contained with in seatbelt 12. Inflator 28 is disposed within airbag 34 proximal fixed end 36 of seatbelt 12. A reinforcing sleeve is disposed around airbag 34 within seatbelt 12. In the illustrative embodiment, reinforcing sleeve 38 comprises an elongate tube composed of up to 1000×1000 denier polyester but preferably 500×1000 denier polyester, with the 1000 denier fibers running in the circumferential direction. Seatbelt 12, reinforcing sleeve 38 and airbag 34 are stitched together proximal the fixed end 36 of seatbelt 12 to form a relatively leak free end. The length of reinforcing sleeve 38 is selected such that the open end 40 of reinforcing sleeve 38 extends just past eyelet 16 of tongue fitting 18 when seatbelt 12 is being worn by a 95th percentile male. Open end 40 of sleeve 38, therefore, extends substantially into torso portion 26 of seatbelt 12 when being worn by a 5th percentile woman. Because the illustrative seatbelt airbag is self-adjusting as described more fully herein, it is inconsequential that the reinforcing sleeve 38 extends substantially into torso portion 26 as long as sleeve 38 extends at least to tongue fitting 18.

Figure 3:
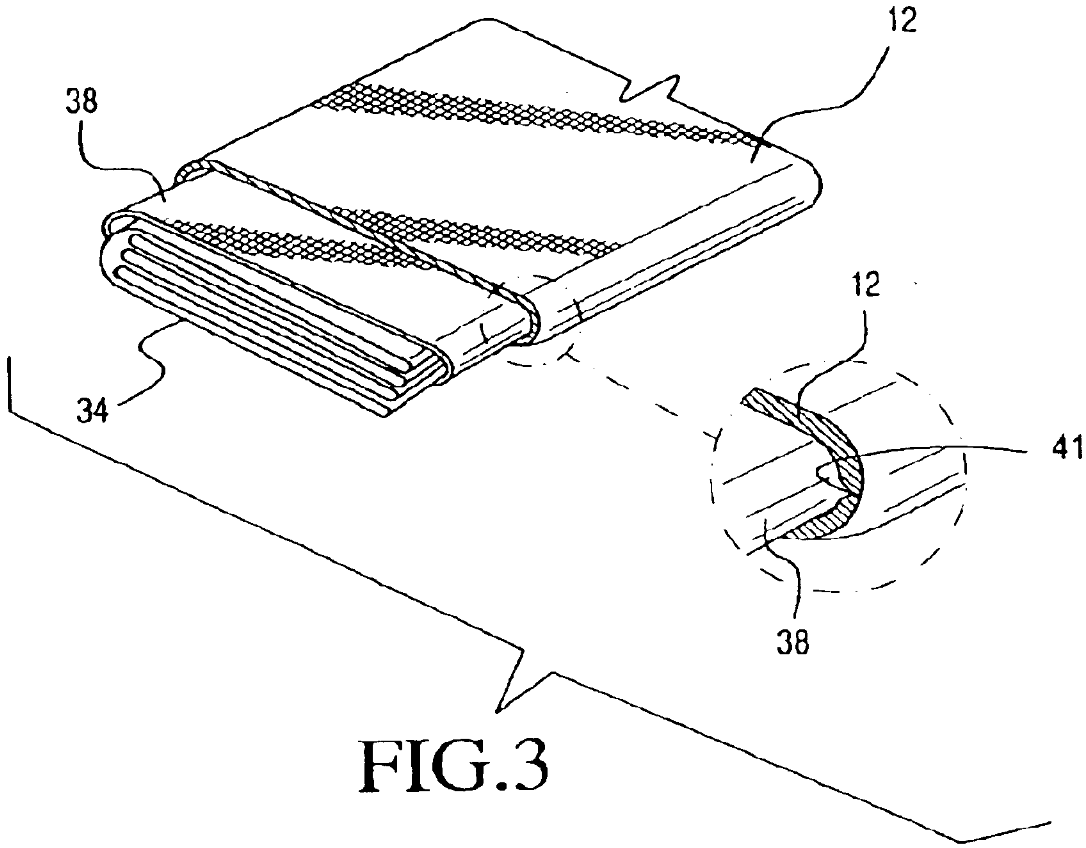
FIG. 3 is a cutaway view of the seatbelt of FIG. 1 in the region of lines 3—3.

The construction of the inflatable seatbelt apparatus 10 of the illustrative embodiment is described in further detail with reference to FIGS. 3 and 4. FIG. 3 depicts a portion of inflatable seatbelt apparatus 10 in lap portion 24. In lap portion 24, inflatable seatbelt apparatus 10 comprises three layers, namely the inner airbag 34, the reinforcing sleeve 38 and the outer seatbelt 12. Although seatbelt 12 has substantial axial strength, it is designed to fail circumferentially under the pressure of airbag 34 when it inflates. To that end, seatbelt 12 may be provided with a longitudinal seam 41 at one or both edges, or seatbelt 12 may be scored, stitched, creased or otherwise provided with a weakened area running along the length of seatbelt 12 in the area surrounding airbag 34. (As used herein, the weakened area is referred to as a seam irrespective of whether it is a true seam or some other feature provided area functions as a locally weakened area.) Reinforcing sleeve 38, however, has sufficient circumferential strength to resist rupturing under the pressure of airbag 34 as it inflates.

Figure 4:
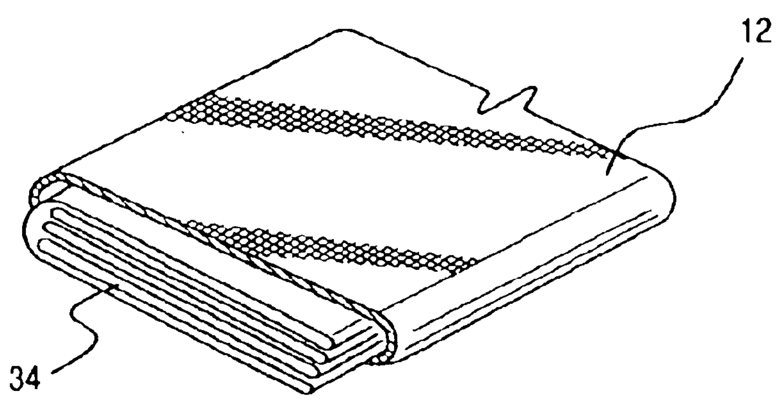
FIG. 4 is a cutaway view of the seatbelt of FIG. 1 in the region of lines 4—4.

As shown in FIG. 4, in torso portion 26, inflatable seatbelt apparatus 10 comprises only two layers, namely the inner airbag 34 and the outer seatbelt 12. Therefore, in the torso portion 26, the airbag 34 is able to rupture outer seatbelt 12. Thus, as airbag 34 inflates, in lap portion 24 reinforcing sleeve 38 expands into a cylindrical shape but does not rupture to permit airbag 34 to fully inflate. In the torso portion 26, however, reinforcing sleeve 38 is absent and therefore as airbag 34 inflates seatbelt 12 ruptures along an axial seam allowing airbag 34 to inflate to its full diameter.

Figure 5:
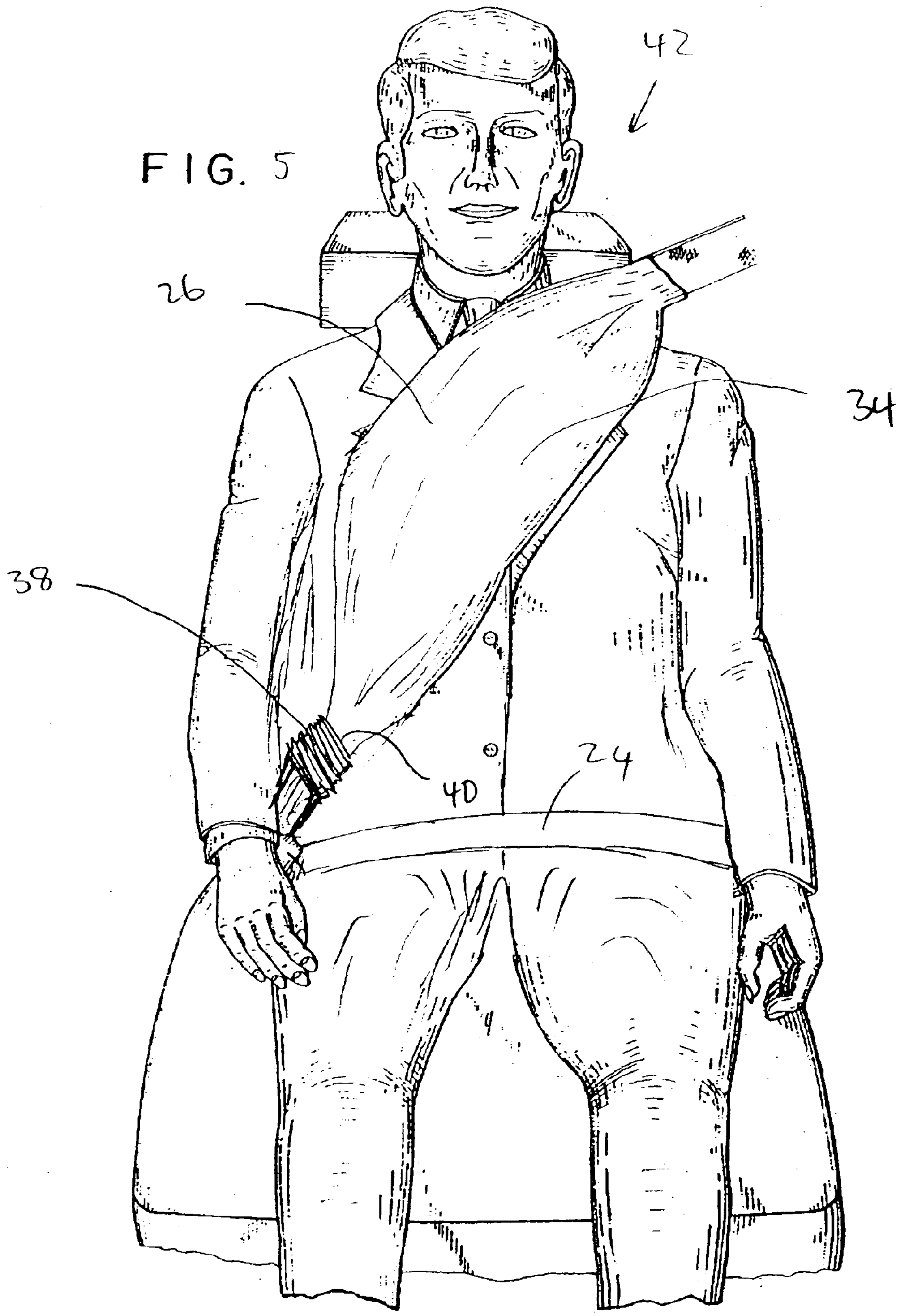
FIG. 5 is a view of the seatbelt of FIG. 1 in the deployed condition.

With reference to FIG. 5, in operation, when the vehicle collides with an obstacle or other obstacles at higher intensity than a predetermined value, inflator 28 is activated to begin a flow of inflation gases into airbag 34. In lap portion 24, reinforcing sleeve 38 prevents airbag 34 from inflating beyond the diameter of reinforcing sleeve 38. This prevents lap portion 24 from expanding to form a large diameter bag that would tend to roll up the hips of the occupant causing the occupant to submarine under the belt. At the same time, allowing airbag 34 to expand to the diameter of reinforcing sleeve 38 causes airbag 34 to form a channel to direct the inflation gases into torso portion 26 where airbag 34, unconstrained by reinforcing sleeve 38, expands to its full diameter to provide a cushion for occupant 42. As airbag 34 expands, the expansion causes airbag 34 to press against open end 40 of reinforcing sleeve 38. This causes reinforcing sleeve 38 to buckle and collapse backward toward tongue fitting 18 in an accordion-like fold. This allows reinforcing sleeve 38 to retract toward tongue fitting 18 permitting airbag 34 to fully inflate across torso portion 26 irrespective of the size of the occupant being restrained.

Figure 6:
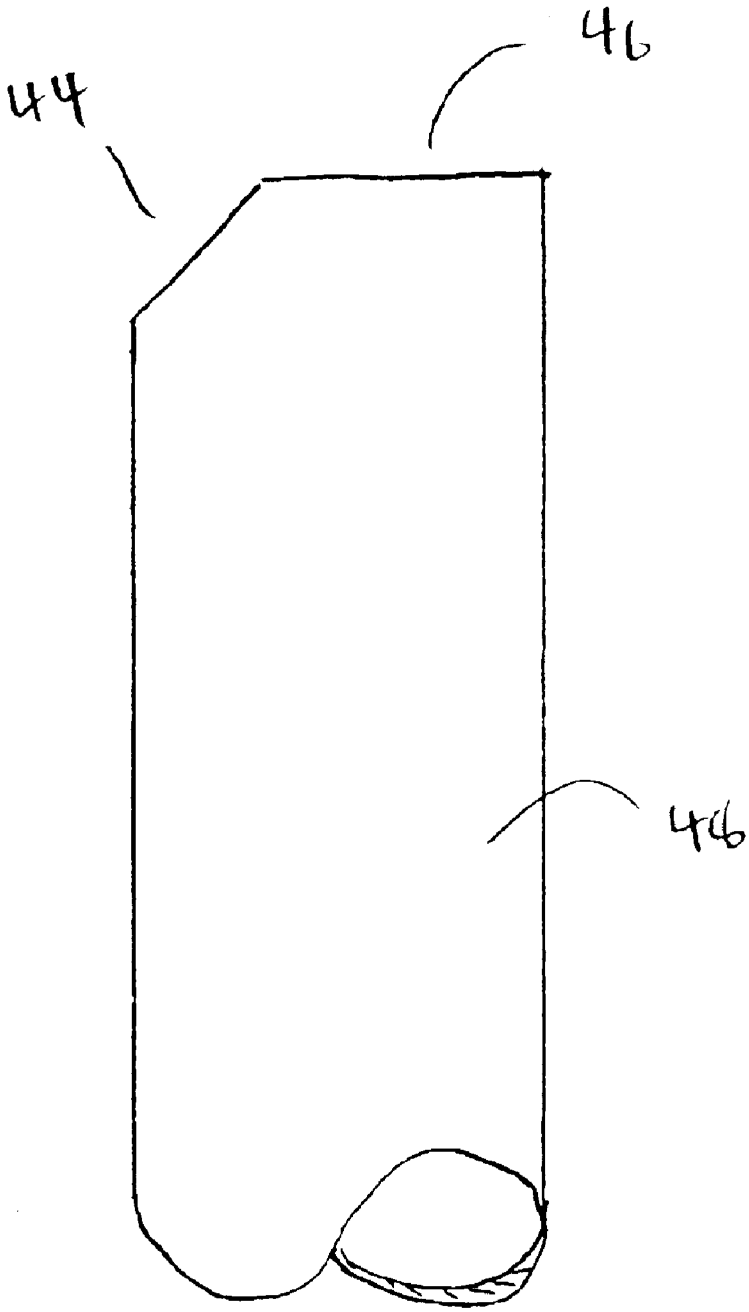
FIG. 6 is a plan view of an alternative embodiment of a reinforcing sleeve incorporating features of the present invention.

As noted hereinbefore, in the illustrative embodiment, reinforcing sleeve 38 comprises up to 1000×1000 denier polyester but preferably a 500×1000 denier polyester fabric tube with the 1000 denier fibers running in the circumferential direction. Accordingly, reinforcing sleeve 38 does not tear under the inflation pressure of airbag 34. In an alternative embodiment, as shown in FIG. 6, reinforcing sleeve 38 is made from a somewhat lighter material, for example a 500×500 denier polyester. Since the fabric is relatively notch sensitive, although it will not rupture under the inflation pressure of airbag 34, it can be designed so that a tear will propagate if a stress concentration is provided. To this end, as shown in FIG. 6, a notch 44 is cut transverse to open end 46 of reinforcing sleeve 48. The notch 44 in combination with the lighter circumferential denier of reinforcing sleeve 48, permits a tear in reinforcing sleeve 48 to propagate from open end 46 toward tongue fitting 18 as airbag 34 is deployed. As with the embodiment of FIGS. 1–5, this enables the airbag to fully inflate across torso portion 26 irrespective of the size of the occupant.

Figure 7:
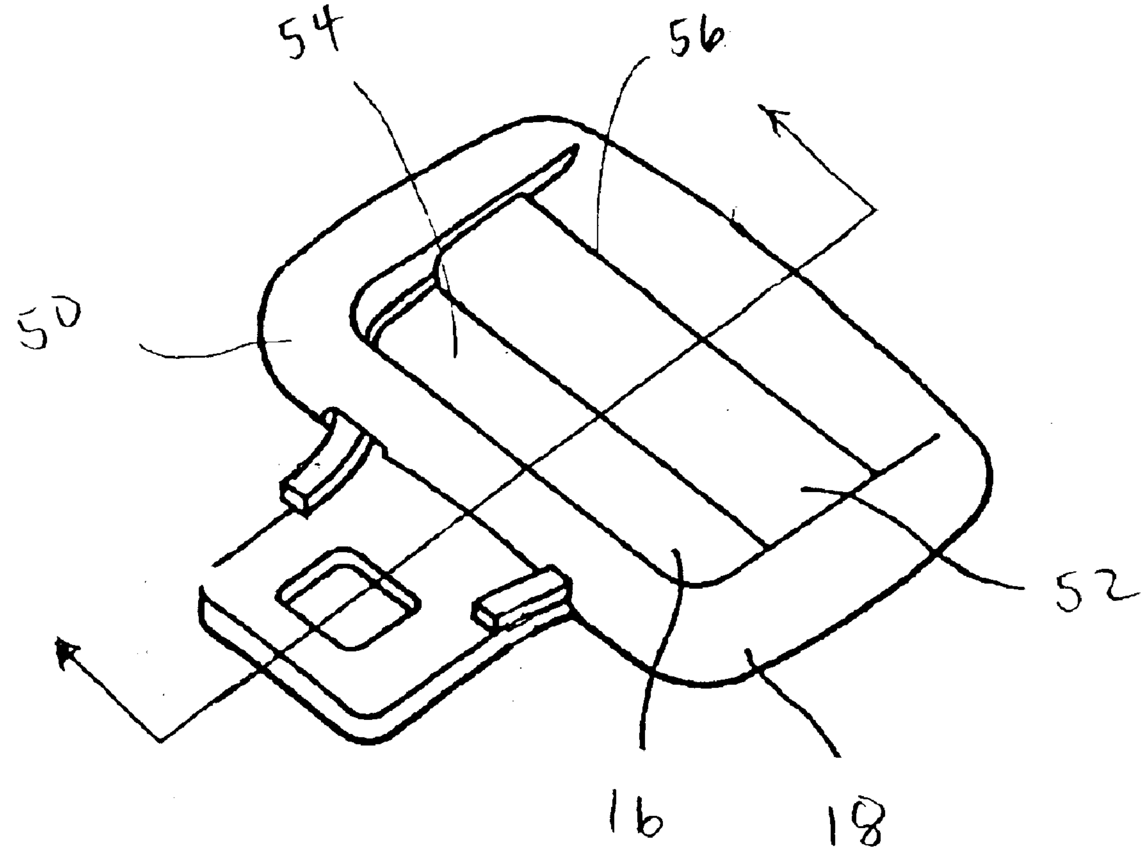
FIG. 7 is a view of a seatbelt tongue for use with a seatbelt incorporating features of the present invention.
Figure 8:
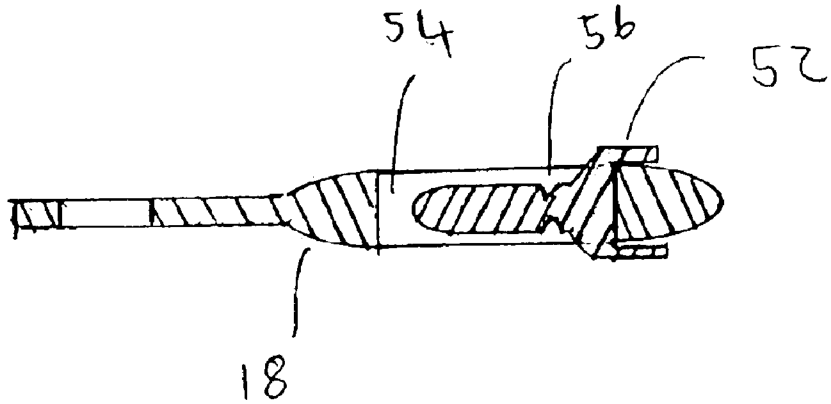
FIG. 8 is a cross-sectional view of the seatbelt tongue of FIG. 7.

As shown in FIG. 7, tongue fitting 18 includes an eyelet 16 through which seatbelt 12 passes to enable seatbelt 12 automatically adjust to fit vehicle occupants of different sizes. Eyelet 16 comprises a slot formed between a body 50 of tongue fitting 18 and a flange 52 that is attached to body 50. The slot 54 that forms eyelet 16 is sized to permit seatbelt 12 to pass therethrough but is sufficiently narrow to prevent seatbelt 12 from twisting or rolling as it passes through eyelet 16. Because slot 54 is narrow, if left intact, slot 54 would restrict the flow of air from lap portion 24 into torso portion 26. Accordingly, as shown in FIG. 8, flange 52 may be snapped in place or otherwise releasably mounted to tongue fitting 18 so that as to airbag 34 inflates flange 52 is dislodged from slot 54. Alternatively, flange 52 may be constructed of frangible plastic material, such as polystyrene, overmolded onto tongue fitting 18 and provided with an undercut section 56 which will allow flange 52 to fracture and be dislodged from slot 54 as airbag 34 inflates.

Figure 10:
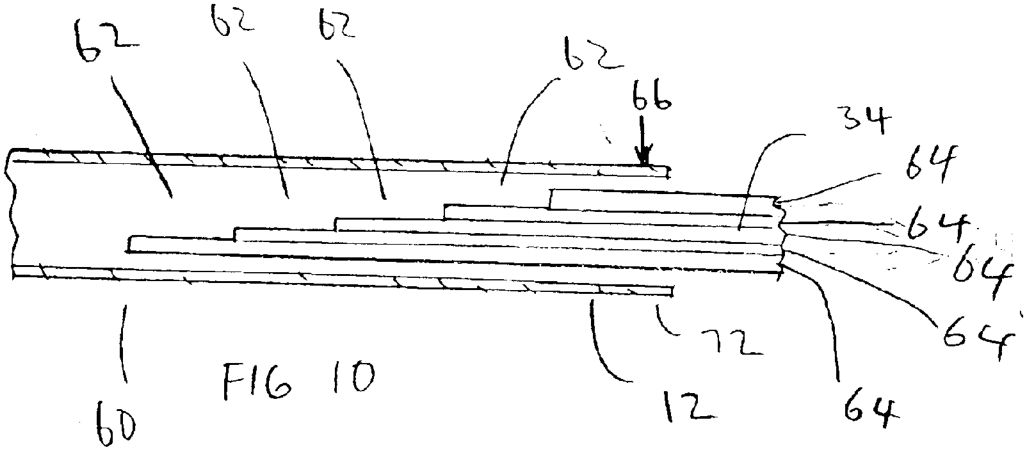
FIG. 10 is a side view of an inflatable airbag for use in a seatbelt incorporating features of the presentation invention.
Figure 9:
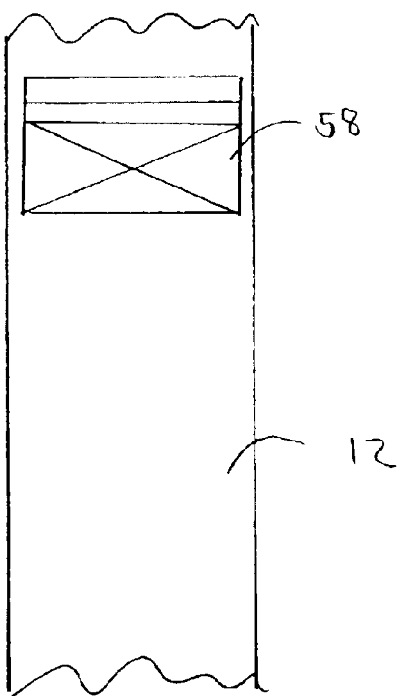
FIG. 9 is a plan view of a prior art "Box X" stitch for joining portions of seatbelt webbing together.
Figure 11:
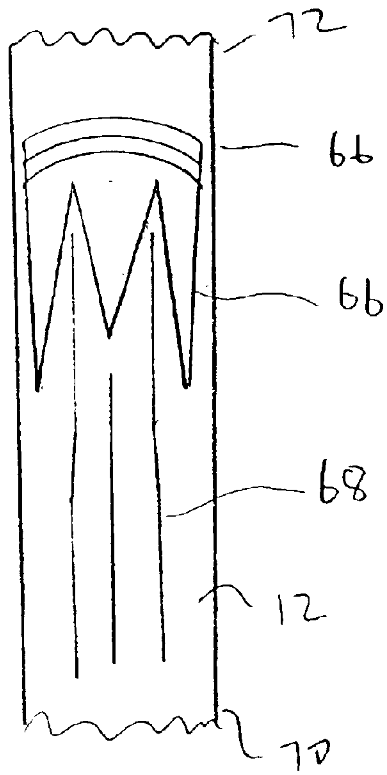
FIG. 11 is a plan view of a stitching pattern for securing the airbag within the seatbelt webbing in accordance with the present invention.

With reference to FIG. 9, conventional seatbelt airbags are ordinarily stitched within seatbelt 12 by means of a conventional "Box-X" stitch 58. Unfortunately, a Box-X stitch is relatively inflexible and causes seatbelt 12 to interfere with the belt retractor 30. Similarly, the sudden transition from the portion of a seatbelt containing an airbag and the portion of the seatbelt not containing the airbag causes a step in the seatbelt material that also interferes with the retractor. Accordingly, as shown in FIGS. 10 and 11, in the illustrative embodiment, end 60 of airbag 34 that is distal from fixed end 36 is cut into a taper. In the illustrative embodiment, the taper is effected by cutting the airbag 34 into a series of steps 62 that correspond with each of the pleats 64 of airbag 34. In the illustrative embodiment, the pitch of the steps 62 are ½ inch each for a total tapered section 2 inches in length. A series of arc stitches 66 form the closure for airbag 34. A zigzag stitch 66 having three points and extending approximately 2 inches along the length of seatbelt 12 secures airbag 34 to seatbelt 12. A plurality of linear stitches 68 run the length of seatbelt 12 distal of end 60 of airbag 34 to maintain seatbelt 12 in its flattened condition to facilitate winding and unwinding from retractor 30. The combination of steps 62 and zigzag stitch 66 cooperate to provide a smooth transition from distal portion 70 of seatbelt 12 where no airbag is present to the proximal portion 72 of seatbelt 12 containing airbag 34.

Although certain illustrative embodiments and methods have been disclosed herein, it will be apparent from the foregoing disclosure to those skilled in the art that variations and modifications of such embodiments and methods may be made without other inflators departing from the spirit and scope of the invention. Accordingly, it is intended that the invention shall be limited only to the extent required by the appended claims and the rules and principals of applicable law.

What is claimed is:

1. A seat belt device for protecting the occupant of a vehicle comprising:

a tongue fitting having an eyelet formed therein, said tongue fitting adapted to be received by a seat belt buckle attached to said vehicle;

a seat belt retractor attached to said vehicle;

a seat belt comprising a flexible fabric tube having a first end attached to said vehicle, a second end attached to said seat belt retractor, and a medial portion passing through said eyelet formed in said tongue fitting, said seat belt forming a three point restraint including a lap portion extending from said first end to said tongue fitting and a torso portion extending from said tongue fitting toward said seat belt retractor;

an inflatable air bag member disposed within said seat belt, said inflatable air bag member extending within said seat belt from a first end proximal said first end of said flexible fabric tube to a second end within said torso portion of said seat belt;

a reinforcing sleeve, said reinforcing sleeve comprising a flexible fabric sleeve having a closed end and an open end, said reinforcing sleeve forming an annular layer between said inflatable air bag member and said flexible fabric tube, said reinforcing sleeve extending from said closed end proximal said first end of said flexible fabric tube to said open end within said torso portion of said seat belt; and an inflator fluidly connected with said inflatable air bag member for providing a source of pressurized gas for inflating said inflatable air bag member.

2. The seat belt device of claim 1, wherein:

said flexible fabric tube includes a longitudinal seam adapted to rupture as said inflatable air bag member inflates.

3. The seat belt device of claim 1, wherein:

said reinforcing sleeve comprises a stress concentration at said open end, said stress concentration being capable of initiating a tear in said reinforcing sleeve that propagates toward said eyelet as said inflatable air bag member is inflated.

4. The seat belt device of claim 3, wherein:

said stress concentration comprises a notch cut into said reinforcing sleeve intersecting said open end of said reinforcing sleeve.

5. The seat belt device of claim 1, wherein:

said reinforcing sleeve comprises a fabric having a denier of no greater than 1000×1000.

6. The seat belt device of claim 1, wherein:

said reinforcing sleeve comprises a fabric having a denier of no greater than 500×500.

7. The seat belt device of claim 1, wherein:

said inflatable air bag member comprises a fabric tube that, in an un-inflated condition assumes the shape of a flat belt having a first and a second lateral edge, said fabric tube being folded into a rooster-tail fold comprising a plurality of pleats along said first lateral edge and a single apex along said second lateral edge.

8. A seat belt airbag comprising:

an inner layer comprising an inflatable air bag member, said inflatable air bag member comprising an elongate tubular member that, in an un-inflated condition assumes the shape of a flat belt having a first and a second lateral edge and a first and a second end, said elongate tubular member being folded into a rooster-tail fold comprising a plurality of pleats along said first lateral edge and a single apex along said second lateral edge, said inflatable air bag member being adapted to deploy under an inflation pressure;

a middle layer comprising a reinforcing sleeve surrounding said inflatable air bag member and extending from a first point proximal said first end of said inflatable air bag member to an open end at a point medial of said first and second ends of said inflatable air bag member, said middle layer comprising a flexible fabric tube having sufficient strength to contain said inflatable air bag member under said inflation pressure; and an outer layer comprising a flexible fabric tube surrounding said inflatable air bag member and said reinforcing sleeve, said outer layer having a longitudinal weakened seam such that said outer layer is incapable of containing said inflatable air bag member under said inflation pressure.

9. The seat belt device of claim 8, wherein:

said reinforcing sleeve comprises a stress concentration at said open end, said stress concentration being capable of initiating a tear in said reinforcing sleeve that propagates away from said open end as said inflatable air bag member is inflated.

10. The seat belt device of claim 9, wherein:

said stress concentration comprises a notch cut into said reinforcing sleeve intersecting said open end of said reinforcing sleeve.

11. The seat belt device of claim 8, wherein:

said reinforcing sleeve comprises a fabric having a denier of no greater than 1000×1000.

12. The seat belt device of claim 8, wherein:

said reinforcing sleeve comprises a fabric having a denier of no greater than 500×500.

* * * * *